(12) United States Patent
Agic

(10) Patent No.: US 7,549,824 B2
(45) Date of Patent: Jun. 23, 2009

(54) MILLING CUTTER, A MILLING CUTTER BODY AND AN INDEXABLE CUTTING INSERT

(75) Inventor: Adnan Agic, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/535,451

(22) Filed: Sep. 26, 2006

(65) Prior Publication Data
US 2007/0071561 A1    Mar. 29, 2007

(30) Foreign Application Priority Data
Sep. 28, 2005   (SE)   ................................. 0502134

(51) Int. Cl.
    *B23C 5/02*    (2006.01)
(52) U.S. Cl. ............................ 407/42; 407/46; 407/113
(58) Field of Classification Search ................... 407/34, 407/46–48, 51–54, 113, 42
    See application file for complete search history.

(56) References Cited

U.S. PATENT DOCUMENTS

| 5,004,380 | A |   | 4/1991 | Hessman et al. |
| 5,332,338 | A | * | 7/1994 | Satran et al. ................... 407/42 |
| 5,720,583 | A | * | 2/1998 | Bohnet et al. .................. 407/42 |
| 5,755,536 | A | * | 5/1998 | Vollmer et al. ............... 407/113 |
| 5,921,723 | A |   | 7/1999 | Satran et al. |
| 6,929,428 | B1 | * | 8/2005 | Wermeister et al. .......... 407/113 |
| 6,939,091 | B2 | * | 9/2005 | Wermeister .................. 407/113 |
| 7,101,121 | B2 | * | 9/2006 | Wermeister et al. .......... 407/113 |
| 7,252,460 | B2 | * | 8/2007 | Rieth .......................... 407/113 |
| 2003/0113175 | A1 | * | 6/2003 | Wermeister .................. 407/113 |
| 2003/0215294 | A1 | * | 11/2003 | Wermeister et al. .......... 407/113 |
| 2005/0129475 | A1 |   | 6/2005 | Ripley et al. |
| 2007/0189864 | A1 | * | 8/2007 | Festeau et al. ............... 407/113 |
| 2007/0217875 | A1 | * | 9/2007 | Fouquer ...................... 407/113 |

FOREIGN PATENT DOCUMENTS

| EP | 548752 A1 * | 6/1993 |
| EP | 0885678 A2 | 12/1998 |
| FR | 2866583 A1 * | 8/2005 |

OTHER PUBLICATIONS

International Search Report from corresponding International Application PCT/SE2006/001055.

* cited by examiner

*Primary Examiner*—Boyer D Ashley
*Assistant Examiner*—Sara Addisu
(74) *Attorney, Agent, or Firm*—WRB-IP LLP

(57) ABSTRACT

A milling cutter for chip removing machining includes a milling cutter body with a number of cutting insert seats in connection to a chip removing end of the milling cutter body, the milling cutter body being formed to cooperate with a tool attachment at its opposite end in the axial direction, wherein indexable cutting inserts are secured in the cutting insert seats, each the indexable cutting insert having a top surface and a bottom surface substantially parallel with the top surface, wherein side surfaces extend between the top surface and the bottom surface, the indexable cutting insert having the basic shape of a truncated pyramid. The invention also relates to a milling cutter body and an indexable cutting insert, per se. Each indexable cutting insert has its top surface facing against the chip removing end of the milling cutter, and main cutting edges of the indexable cutting insert extend from the top surface of the indexable cutting insert.

18 Claims, 5 Drawing Sheets

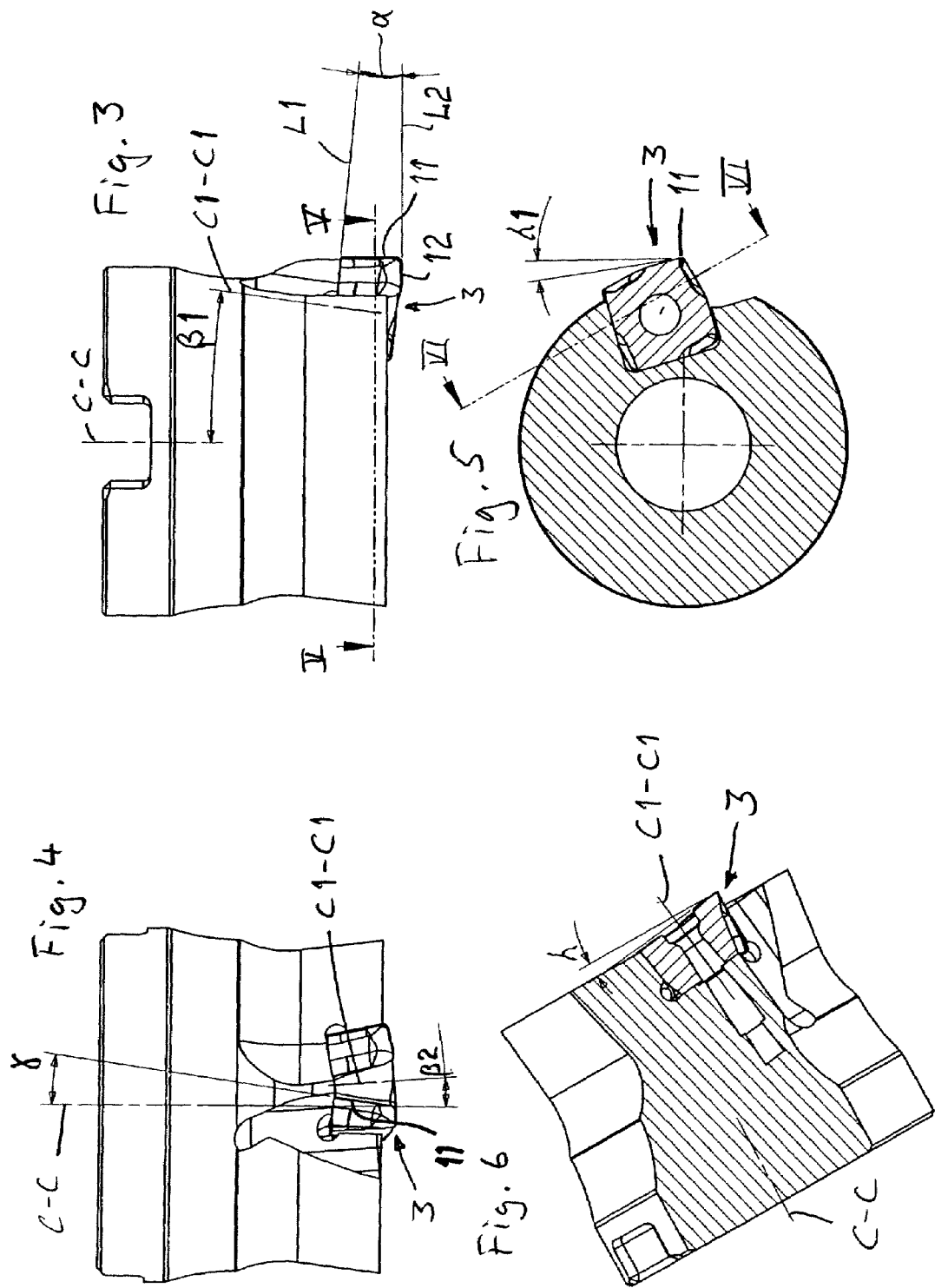

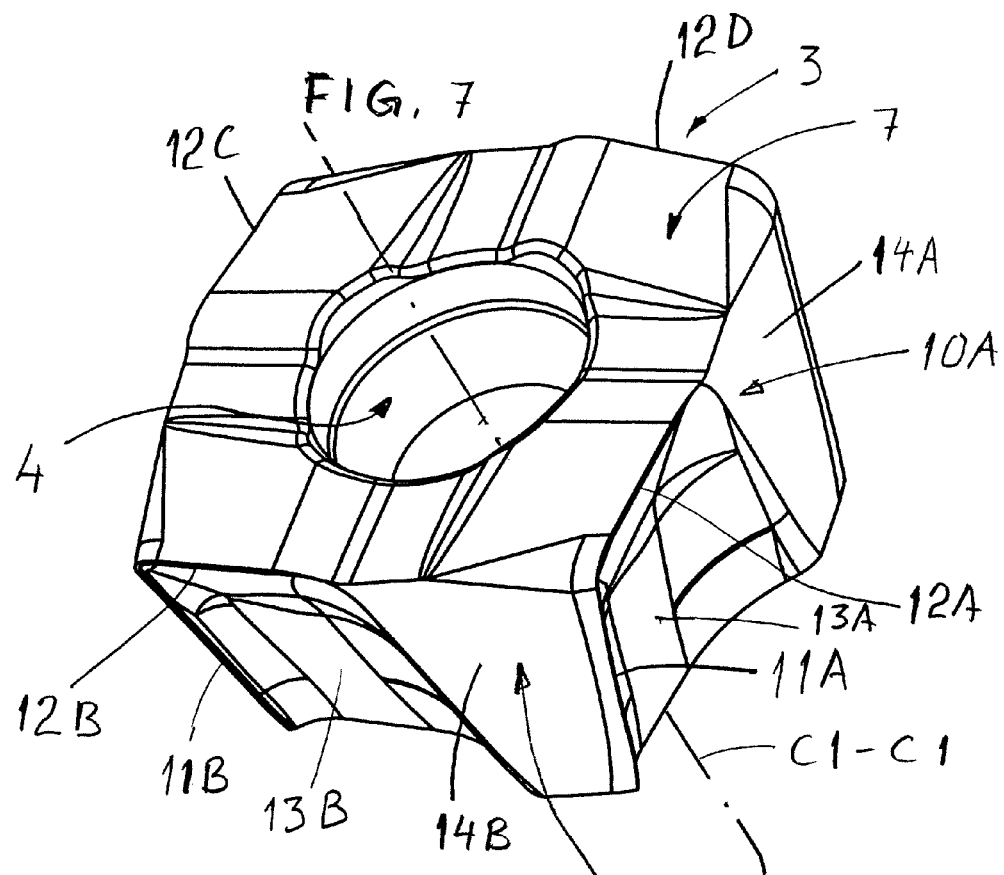
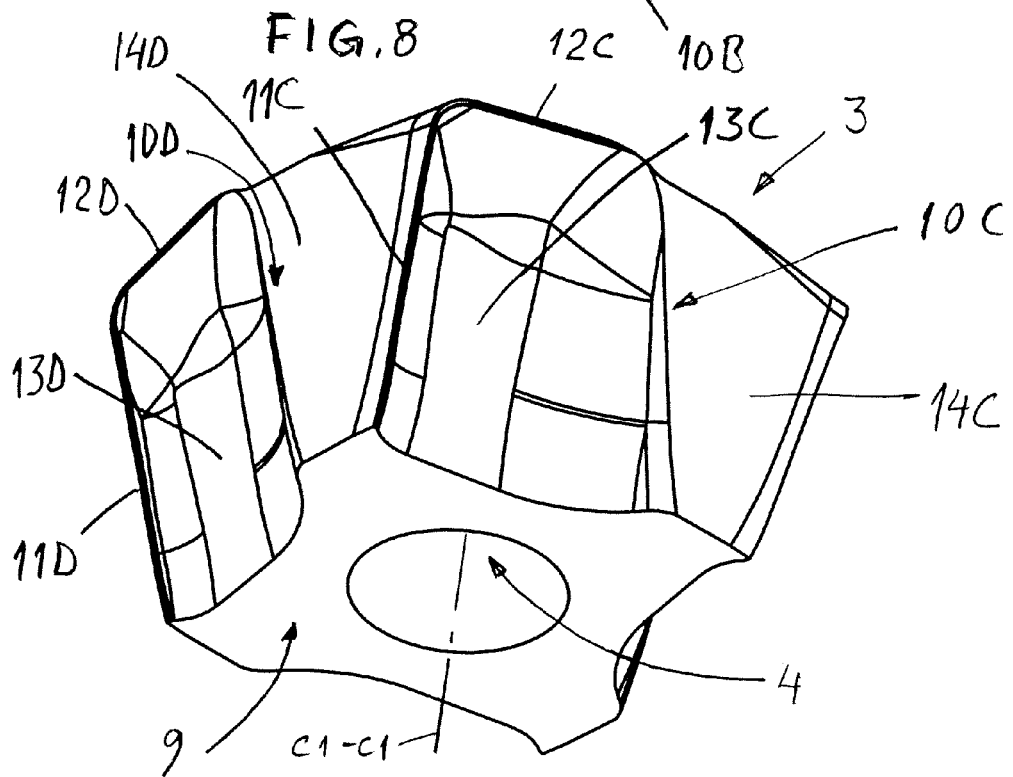

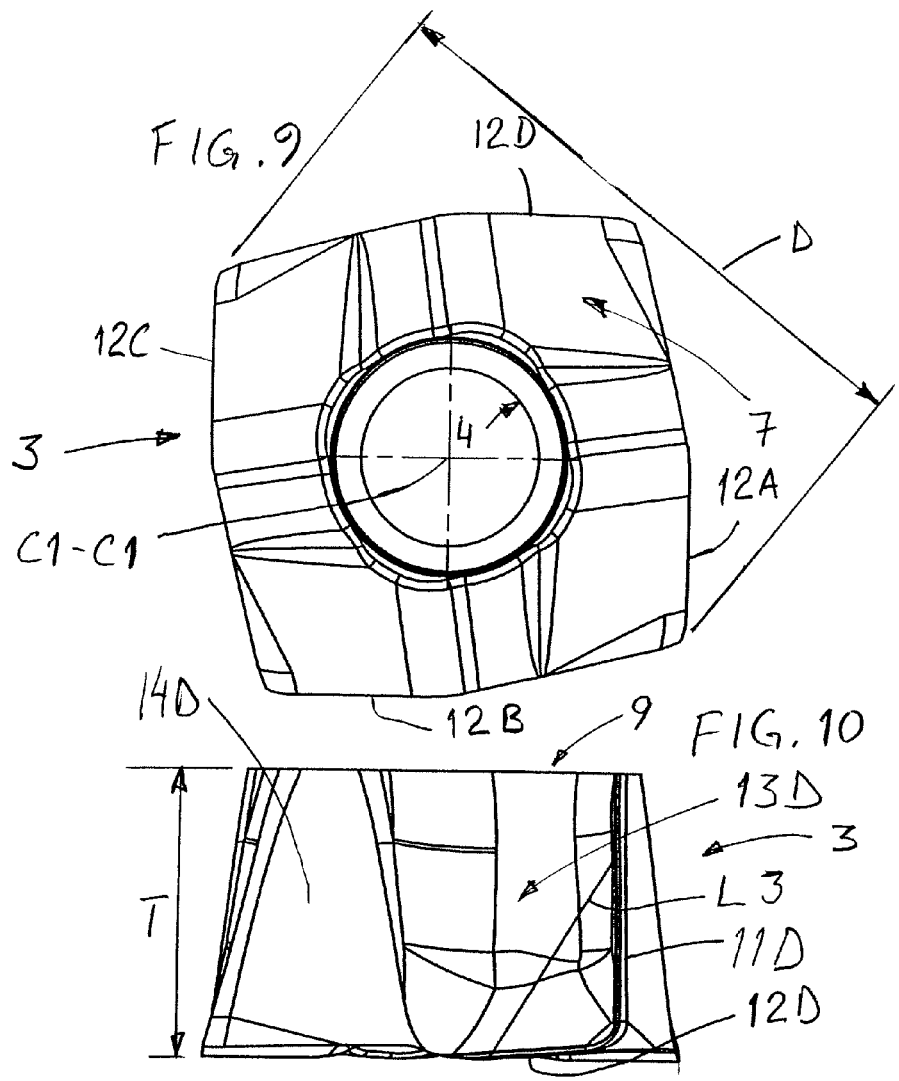
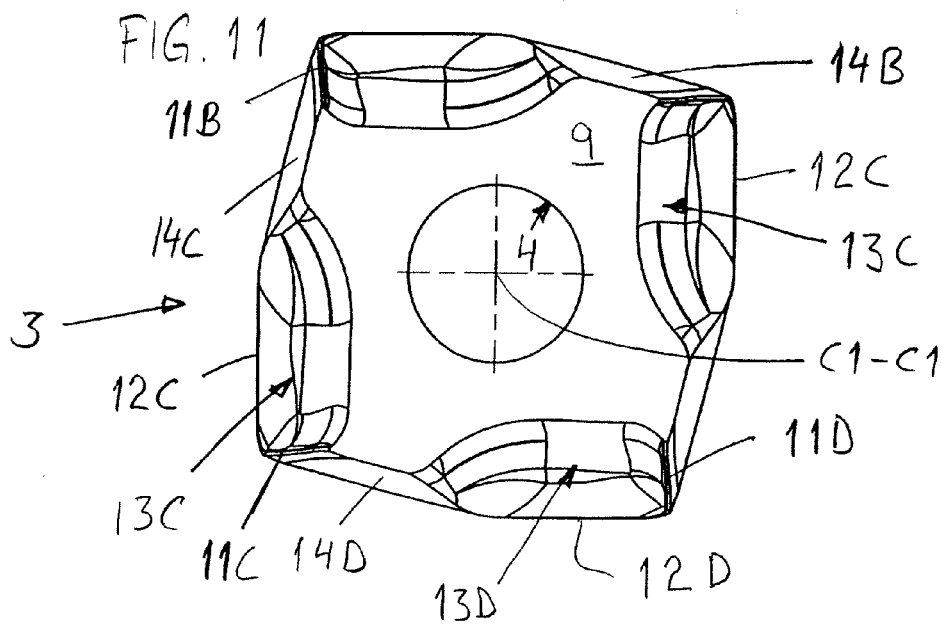

MILLING CUTTER, A MILLING CUTTER BODY AND AN INDEXABLE CUTTING INSERT

BACKGROUND AND SUMMARY

The present invention generally relates to a milling cutter for chip removing machining, a milling cutter body and an indexable cutting insert that is intended to be mounted to a milling cutter body.

A milling cutter is previously known, which comprises a milling cutter body that is provided with a number of indexable cutting inserts. Each indexable cutting insert comprises a number of main cutting edges and a minor cutting edge associated with each major cutting edge. A minor cutting edge forms a right angle with an associated major cutting edge. This known milling cutter is especially intended for milling of right-angled corners in a work piece. A drawback that this known milling cutter has is that the cutting depth is limited to the length of the main cutting edge since the minor cutting edge on same edge as the cutting insert is situated radially outside of the main cutting edge when the cutting insert is mounted on the milling cutter body.

A face milling cutter is also known which comprises first cutting inserts the center holes of which are essentially axially directed and second cutting inserts the center holes of which are essentially radially directed relative to a holder of the face milling cutter. The first and second cutting inserts are identical. According to a preferred embodiment each cutting insert comprises four cutting insert corners, however different parts of the cutting inserts are used as active cutting edges depending on whether the center holes are oriented axially or radially. In relation to the present invention the cutting inserts with axially directed center hole are most pertinent. In order to activate all four cutting insert corners in one position with axially directed center holes the cutting inserts must be both indexed and flipped.

It is desirable to provide a milling cutter and indexable cutting inserts adapted thereto, the milling cutter being able to machine right-angled corners in a work piece to great cutting depths.

It is also desirable to provide the indexable cutting inserts according to an aspect of the present invention provided in the milling cutter according to the present invention must be indexable four times during its life-span.

It is also desirable to orient indexable cutting inserts such that they can be secured by means of center screws with a relatively long length of anchor.

According to an aspect of the present invention, a milling cutter for chip removing machining comprises a milling cutter body with a plurality of cutting insert seats proximate an end of the milling cutter body, the milling cutter body being adapted to cooperate with a tool attachment at an opposite end of the milling cutter body in an axial direction, indexable cutting inserts being secured in the cutting insert seats, each indexable cutting insert having a top surface and a bottom surface substantially parallel with the top surface, wherein side surfaces extend between the top surface and the bottom surface, wherein each indexable cutting insert has a basic shape of a truncated pyramid, and each indexable cutting insert has a top surface facing towards a chip removing end of the milling cutter, and main cutting edges of the indexable cutting insert extend from the top surface of the indexable cutting insert in a direction towards the bottom surface of the indexable cutting insert.

According to another aspect of the present invention, a milling cutter body comprises a free end with a plurality of cutting insert seats proximate the free end, the milling cutter body being adapted to cooperate with a tool attachment at an opposite end in the axial direction, each cutting insert seat comprising a plurality of support surfaces, wherein a support surface that is facing towards the free end of the milling cutter body has means for cooperating with a clamping means for an indexable cutting insert having the basic shape of a truncated pyramid.

According to another aspect of the present invention, an indexable cutting insert that is intended to be mounted in a cutting insert seat of a milling cutter body comprises a top surface and a bottom surface substantially parallel with the top surface, wherein side surfaces connect the top surface and the bottom surface, wherein the indexable cutting insert has the basic shape of a truncated pyramid and main cutting edges of the indexable cutting insert extend from the top surface in direction towards the bottom surface.

BRIEF DESCRIPTION OF THE DRAWINGS

Below follows a preferred embodiment of the invention that is described with reference to the enclosed drawings, wherein:

FIG. 3 schematically shows the same side view of the milling cutter as in FIG. 2, however the milling cutter being provided with only one cutting insert for clarity reasons;

FIG. 4 schematically shows another side view of the milling cutter;

FIG. 5 shows a cross-section along the line V-V in FIG. 3;

FIG. 6 shows a cross-section after the line VI-VI in FIG. 5;

FIG. 7 shows a perspective view obliquely from above of an indexable cutting insert according to the present invention, the milling cutter according to the present invention being provided with a number of such indexable cutting inserts;

FIG. 8 shows a perspective view oblique from below of the indexable cutting insert according to FIG. 7;

FIG. 9 shows a plan view of the indexable cutting insert according to FIG. 7;

FIG. 10 shows a side view of the indexable cutting insert according to FIG. 7; and FIG. 11 shows a view of the bottom surface of the indexable cutting insert according to FIG. 7.

DETAILED DESCRIPTION

Figure 1:
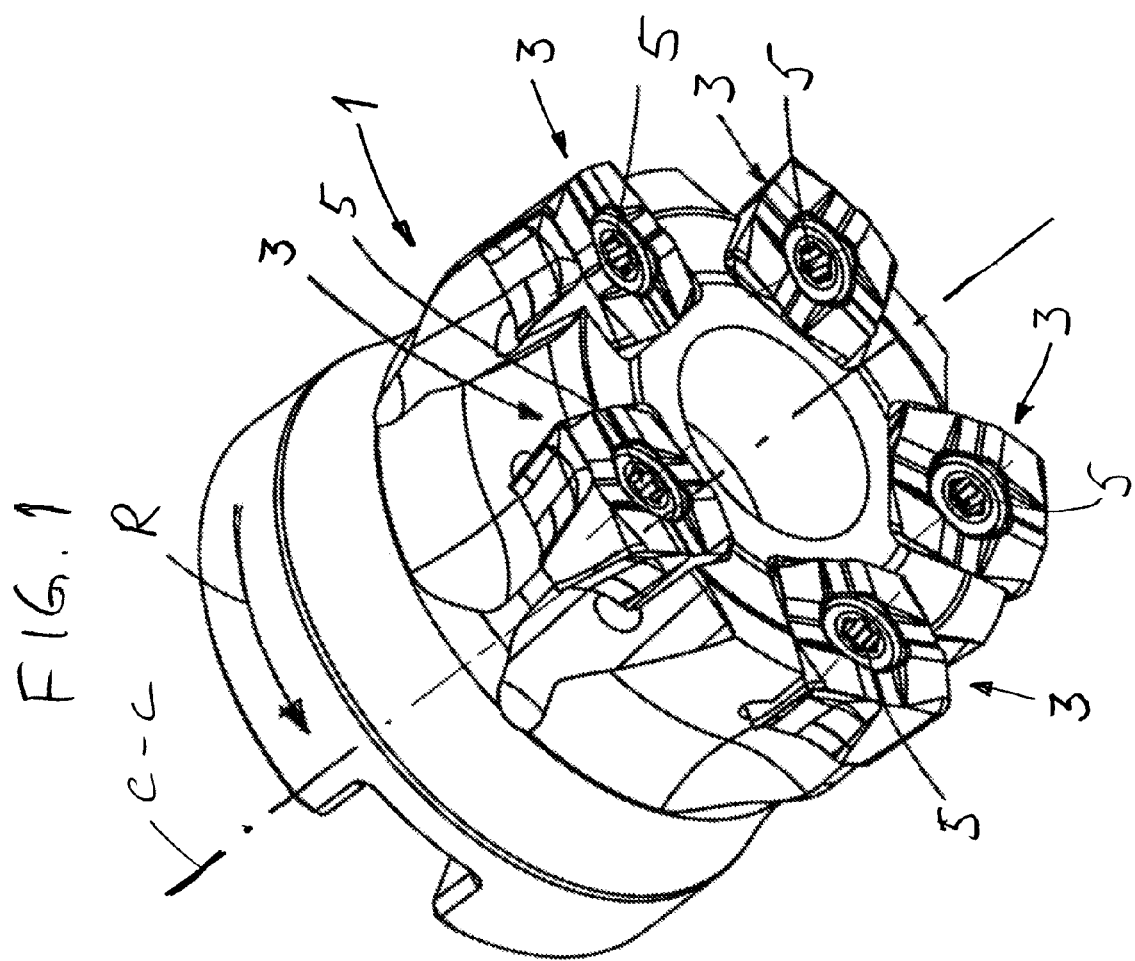
FIG. 1 shows a perspective view of a milling cutter according to the present invention.
Figure 2:
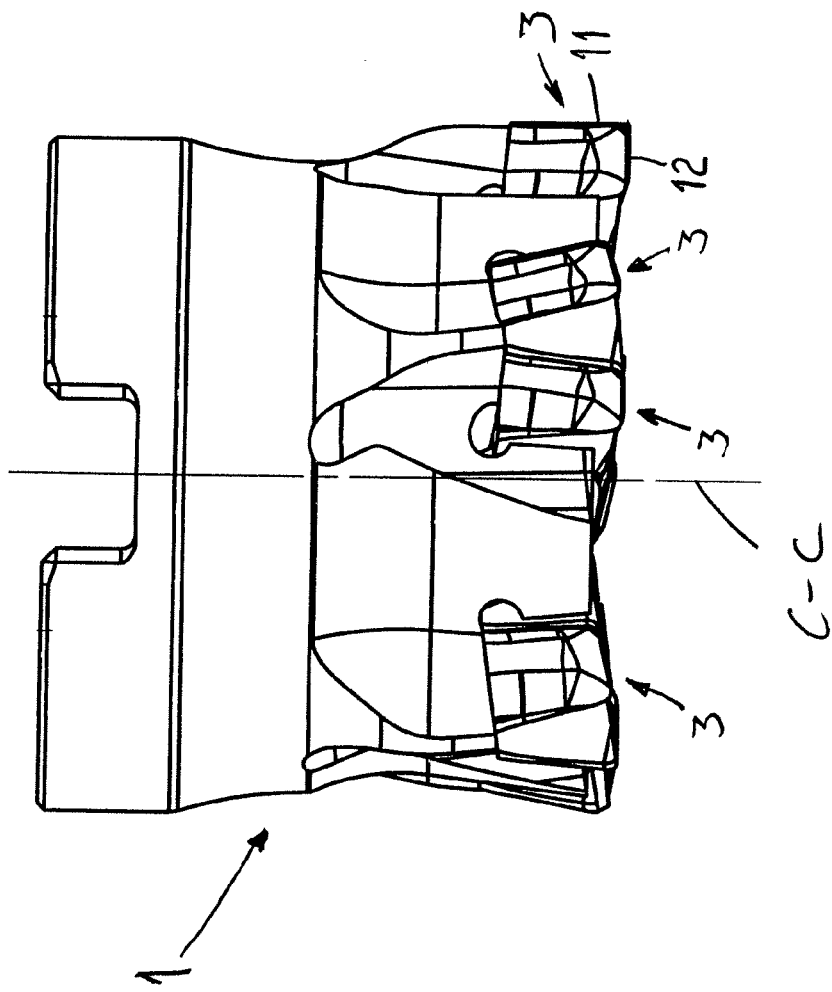
FIG. 2 shows a side view of the milling cutter according to FIG. 1.

The milling cutter according to the present invention shown in FIGS. 1 and 2 comprises a milling cutter body 1, which has a number of cutting insert seats at the forwardly facing end in FIG. 1, in which a corresponding number of indexable cutting insert 3 are received. Each indexable cutting insert 3 has a center hole 4 and is secured in an associated cutting insert seat by means of a center screw 5 received by the center hole 4. In FIG. 1 the center axis C-C of the milling cutter is drawn, the center axis C-C also defining the axis of rotation of the milling cutter and its axial direction. The rotational direction R of the milling cutter is depicted with an arrow in FIG. 1.

The center screws 5 extend along the axial direction of the milling cutter, however the center screws 5 are not parallel with the rotational axis C-C. The indexable cutting inserts 3 are consequently tangentially mounted in the milling cutter body 1.

The milling cutter body 1 is formed for connection with a tool attachment or the like at the rear end in FIG. 1.

From the side view of the milling cutter that is shown in FIG. 2 is clearly evident that when the indexable cutting insert 3 is mounted in the milling cutter body the indexable cutting insert incline, i.e. the center axis of the indexable cutting insert, which coincides with the longitudinal direction of the associated center screw, is not parallel with the center axis C-C of the milling cutter.

In below-described FIGS. 3-6 only the cutting insert 3 is drawn for reasons of clarity. At the side view shown in FIG. 3 the major cutting edge and minor cutting edge of the cutting insert 3 form a right angle. As is evident from FIG. 3 the bottom surface of the cutting insert seat, symbolized by a first line L1, forms a certain angle α with a second line L2 that extends perpendicularly towards the axis of rotation C-C of the milling cutter. The reason for the seat bottom surface of the cutting insert being angled is that only one corner of the cutting insert should be active, i.e. the remaining three corners should be situated axially rearwardly of the line L2. For exemplifying but not limiting purpose can be mentioned that the angle α may be in the magnitude of 5°. In FIG. 3 is also shown an angle β1 between the center axis C-C of the milling cutter and the center axis C1-C1 of the cutting insert 3. In the side view shown in FIG. 3 this angle is about 8°.

The side view shown in FIG. 4 is taken in a position that is perpendicular to the position for FIG. 3. In FIG. 4 the axial rake angle for the major cutting edge 11 of the cutting insert 3 is drawn in, the angle being depicted by γ. The axial rake angle γ is positive and is about 7° in the shown side view. In FIG. 4 is also shown an angle β2 between the center axis C-C of the milling cutter and the center axis C1-C1 of the cutting insert 3. In the side view shown in FIG. 4 the angle is about 7°.

The cross-section shown in FIG. 5 is taken along V-V in FIG. 3. The clearance angle for the main cutting edge 11 is designated with λ1. This angle will lie in the interval of $5° \leq \lambda 1 \leq 15°$, with a preferred value on λ1 about 8°.

The cross-section shown in FIG. 6 is taken along VI-VI in FIG. 5. The clearance angle for a wiper edge of the cutting insert 3 is designated with λ in FIG. 6, wherein this angle lies within the interval of $5° \leq \lambda \leq 12°$ with a preferred value at 6°. The indexable cutting inserts 3 according to the present invention that are provided in the milling cutter 1 according to the present invention are shown in more detail in FIGS. 7-11. The center axis C1-C1 of the indexable cutting insert 3 is drawn in FIGS. 7, 8, 9 and 11, the center axis C1-C1 also defining the axial direction of the indexable cutting insert 3. Each of the indexable cutting inserts 3 comprises a top surface 7 and a bottom surface 9 parallel thereto. The area for the top surface 7 is bigger than the area for the bottom surface 9. The top surface 7 and the bottom surface 9 are united by means of four side surfaces 10A, 10B, 10C, 10D. The center hole 4 of the indexable cutting insert 3 opens into both the top surface 7 and the bottom surface 9.

Generally, the indexable cutting insert 3 has the shape of a truncated pyramid, wherein the top surface 7 corresponds to the great base surface while the bottom surface 9 corresponds to the little base surface. When the milling body according to the present invention is equipped with indexable cutting inserts 3, the bottom surface 9 of each indexable cutting insert 3 abuts a supporting surface of each cutting insert seat, the supporting surface generally extending laterally to the axial direction C-C of the milling cutter.

Four main cutting edges 11A, 11B, 11C, 11D are formed at the intersection of two adjacent side surfaces, which generally extend along the axial direction C1-C1 of the indexable cutting insert, however not parallel with the axial direction C1-C1. An alternative way of expressing this is that the main cutting edges 11A, 11B, 11C, 11D extend from the top surface 7 in direction towards the bottom surface 9. Analogous with the truncated pyramid the side edges of the truncated pyramid, i.e. the intersection of two adjacent side surfaces, comprises the main cutting edges 11A-11D of the indexable cutting insert 3 according to the present invention. However, in the shown embodiment each major cutting edge is provided radially inside the intersection. At the intersection of the top surface 7 and the side surfaces 10A, 10B, 10C, 10D are formed minor cutting edges 12A, 12B, 12C, 12D, which generally extend laterally to the axial direction C1-C1 of the indexable cutting insert 3. The indexable cutting insert 3 according to the present invention shown in FIGS. 7-11 comprises four pairs of cutting edges.

In the side surface 10A, 10B, 10C, 10D that is associated with a major cutting edge 11A, 11B, 11C, 11D is provided a rake face 13A, 13B, 13C, 13D associated with the main cutting edge, which generally has a concave shape. In the shown embodiment of the indexable cutting insert 3 each rake face 13A, 13B, 13C, 13D opens into the bottom surface 9 but not into the top surface 7. More exactly, the rake face 13A, 13B, 13C, 13D connects to the top surface 7 via the minor cutting edge 12A, 12B, 12C, 12D. A support surface 14A, 14B, 14C, 14D is situated at one and the same side surface 10A, 10B, 10C, 10D adjacent to the rake face 13A, 13B, 13C, 13D. Of the four support surfaces 14A, 14B, 14C, 14D of an indexable cutting insert 3 three cooperate with a surface of the cutting insert seat wherein the indexable cutting insert 3 is received. The fourth support surface connects to the active the main cutting edge 11A, 11B, 11C, 11D and comprises clearance surface for this active major cutting edge.

A line L3 is drawn in FIG. 10, which extends from the main cutting edge 11D to the minor cutting edge 12D. Therein can be noted that this line L3 does not intersect the plane of the support surface 14D. In FIGS. 9 and 10 is also the greatest diagonal measure D and thickness T of the indexable cutting insert 3 marked, wherein the relationship T/D>0.4. In the shown embodiment T/D is about 0.5. In this connection shall be noted that the indexable cutting insert 3 is intended to be clamped in the milling cutter body 1 in its thickness direction, and consequently the bottom surface 9/"little the base surface" abuts against a supporting surface of the cutting insert seat.

As pointed out above a primary function of the milling cutter according to the present invention is to mill right-angled corners, and in this connection is referred to FIGS. 2 and 3. At the lower right end of FIG. 2 is shown an indexable cutting insert 3 according to the present invention, wherein the side view in FIG. 2 shows a major cutting edge 11 and a minor cutting edge 12 of this indexable cutting insert 3. This view illustrates how the milling cutter according to the present invention achieves right-angled corners in a work piece. Through study of FIG. 2 is also perceived that the cutting depth that the milling cutter according to the present invention can take does not have any limitations that depend on the milling cutter geometry.

The embodiment shown in FIGS. 1 and 2 of a milling cutter according to the present invention machines the work piece with a positive axial angle, i.e. the in axial direction extremely positioned part of the main cutting edge 11A, 11B, 11C, 11D comes first in engagement with the work piece.

In the above described embodiment the indexable cutting insert 3 has four main cutting edges and four associated minor cutting edges. However, within the scope of the invention each indexable cutting insert may have three main cutting edges and three associated minor cutting edges.

The shown embodiment of the milling cutter according to the present invention machines the work piece under a positive axial angle. This angle can also be chosen negative.

The disclosures in Swedish patent application No. 0502134-0, from which this application claims priority are incorporated herein by reference.

The invention is in no way limited to the above-described embodiment but can be freely varied within the limits of the appended claims.

What is claimed is:

1. A milling cutter for chip removing machining, the milling cutter comprising a milling cutter body with a plurality of cutting insert seats proximate an end of the milling cutter body, the milling cutter body being adapted to cooperate with a tool attachment at an opposite end of the milling cutter body in an axial direction, indexable cutting inserts being secured in the cutting insert seats, each indexable cutting insert having a top surface and a bottom surface substantially parallel with the top surface, wherein side surfaces extend between the top surface and the bottom surface, wherein each indexable cutting insert has a basic shape of a truncated pyramid, and each indexable cutting insert has a top surface facing towards a chip removing end of the milling cutter, and main cutting edges of the indexable cutting insert extend from the top surface of the indexable cutting insert in a direction towards the bottom surface of the indexable cutting insert, wherein each main cutting edge of the indexable cutting insert is defined by the intersection of two adjacent side surfaces.

2. A milling cutter according to claim 1, wherein a rake face is provided in a side surface of the indexable cutting insert, and the rake face is provided in connection with a major cutting edge.

3. A milling cutter according to claim 2, wherein minor cutting edges of the indexable cutting insert are defined by an intersection of an associated rake face and the top surface.

4. A milling cutter according to claim 1, wherein a rake face is provided in a side surface of the indexable cutting insert, and the rake face is provided in connection with a major cutting edge.

5. A milling cutter according to claim 4, wherein minor cutting edges of the indexable cutting insert are defined by an intersection of an associated rake face and the top surface.

6. A milling cutter body according to claim 1, wherein the insert has the shape of the truncated pyramid when viewed in a direction substantially parallel to the top surface and the bottom surface.

7. An indexable cutting insert that is intended to be mounted in a cutting insert seat of a milling cutter body, the indexable cutting insert comprising a top surface and a bottom surface substantially parallel with the top surface, wherein side surfaces connect the top surface and the bottom surface, wherein the indexable cutting insert has the basic shape of a truncated pyramid and main cutting edges of the indexable cutting insert extend from the top surface in direction towards the bottom surface, wherein each main cutting edge of the indexable cutting insert is defined by the intersection of two adjacent side surfaces.

8. An indexable cutting insert according to claim 7, wherein a rake face is provided in a side surface of the indexable cutting insert, and the rake face is associated with a major cutting edge.

9. An indexable cutting insert according to claim 8, wherein the rake face opens into the bottom surface.

10. An indexable cutting insert according to claim 8, wherein minor cutting edges of an indexable cutting insert are defined by the intersection of an associated rake face and the top surface.

11. An indexable cutting insert according to claim 7, wherein a support surface is also provided in a side surface.

12. An indexable cutting insert according to claim 7, wherein a rake face is provided in a side surface of the indexable cutting insert, and the rake face is associated with a major cutting edge.

13. An indexable cutting insert according to claim 12, wherein the rake face opens into the bottom surface.

14. An indexable cutting insert according to claim 12, wherein minor cutting edges of an indexable cutting insert are defined by the intersection of an associated rake face and the top surface.

15. An indexable cutting insert according to claim 12, wherein a support surface is also provided in a side surface.

16. An indexable cutting insert according to claim 7, wherein the indexable cutting insert is provided with a center hole that opens into the top surface and the bottom surface.

17. An indexable cutting insert according to claim 7, wherein a relationship between thickness of the indexable cutting insert and a greatest diagonal measure of the insert is greater than 0.4.

18. An indexable cutting insert according to claim 7, wherein the insert has the shape of the truncated pyramid when viewed in a direction substantially parallel to the top surface and the bottom surface.

* * * * *